United States Patent
Stemmler et al.

(10) Patent No.: US 6,557,773 B2
(45) Date of Patent: May 6, 2003

(54) HEATING SYSTEM FOR HEATING THE PASSENGER COMPARTMENT OF A MOTOR VEHICLE

(75) Inventors: Martin Stemmler, Penzing (DE); Ingrid Lanzl, Munich (DE)

(73) Assignee: Webasto Thermosysteme International GmbH, Stockdorf (DE)

( * ) Notice: Subject to any disclaimer, the term of this patent is extended or adjusted under 35 U.S.C. 154(b) by 0 days.

(21) Appl. No.: 09/979,311

(22) PCT Filed: May 13, 2001

(86) PCT No.: PCT/EP01/02773

§ 371 (c)(1), (2), (4) Date: Feb. 13, 2002

(87) PCT Pub. No.: WO01/70530

PCT Pub. Date: Sep. 27, 2001

(65) Prior Publication Data

US 2002/0158057 A1 Oct. 31, 2002

(30) Foreign Application Priority Data

Mar. 22, 2000 (DE) .......................................... 100 14 021

(51) Int. Cl.⁷ ................................................. B60H 1/02

(52) U.S. Cl. ................................. 237/12.3 C; 219/283; 219/209; 165/41; 392/484

(58) Field of Search ....................... 237/12.3 C, 12.3 R; 219/208, 209; 165/41, 42; 392/484

(56) References Cited

U.S. PATENT DOCUMENTS 4,245,593 A * 1/1981 Stein .................... 123/142.5 R
4,249,491 A * 2/1981 Stein .................... 123/142.5 R
4,640,262 A * 2/1987 Lucius ................... 126/110 B

FOREIGN PATENT DOCUMENTS

| DE | 198 00 756 | 7/1998 |
| DE | 198 57 240 | 6/2000 |
| DE | 199 02 050 | 9/2000 |
| JP | 07-223429 | 12/1995 |

* cited by examiner

Primary Examiner—Derek S. Boles
(74) Attorney, Agent, or Firm—Nixon Peabody LLP; David S. Safran

(57) ABSTRACT

A heating system for heating the interior of a motor vehicle including a combustion heater for burning fuel in order to heat air supplied to the vehicle interior and/or liquid in the vehicle in the cooling circuit of the engine. An electrical heating device is integrated into the combustion heater in order to supply heat to the air or liquid to be heated.

12 Claims, 1 Drawing Sheet

HEATING SYSTEM FOR HEATING THE PASSENGER COMPARTMENT OF A MOTOR VEHICLE

BACKGROUND OF THE INVENTION

1. Field of the Invention

This invention relates to a system for heating the interior of a motor vehicle and includes a combustion heater for burning fuel in a heat exchanger in order to heat the air supplied to the vehicle interior and/or liquid in the vehicle in the cooling circuit of the engine.

2. Description of Related Art

To heat a motor vehicle interior independently of the vehicle engine, conventionally, combustion heaters are combined with a conventional heating system which is based on heat exchange with the coolant circuit of the engine. The combustion heater can burn fuel from the vehicle fuel tank in order either to directly heat air which is delivered into the vehicle interior or to heat coolant in the coolant circuit which then delivers heat to the vehicle interior via one or more heat exchangers.

German Patent Application DE 199 02 050 A1 discloses a heat exchange which is equipped with an electrical heating device. Heating by means of an electrical heating device, especially with the engine off, is possible only for a very short time since otherwise the vehicle battery is overloaded and restart of the engine is endangered.

German Patent Application DE 198 57 240 A1 discloses a heater which can be operated both with liquid fuel and also with an electrical heating element in the form of a heating coil which can be integrated into the heat exchanger of the heater. The heating coil must be inserted during installation into the vehicle heater or its heat exchanger and contacts established, a complex procedure. Since in the area of the heating coils a liquid heat exchange medium is circulated, both the heating coil and also its contacts must be provided with waterproof insulation. This greatly increases the costs of one such combined heating device.

SUMMARY OF THE INVENTION

The primary object of the invention is to devise a motor vehicle heating system with a combustion heater which can be operated as flexibly as possible and still has simple installation, low costs, good efficiency and low installation space requirements.

This object is achieved in accordance with the invention by a heating system with a combustion heater for burning fuel in a heat exchanger in order to heat the air supplied to the vehicle interior and/or liquid in the vehicle in the cooling circuit of the engine, whereby an electrical heating device is integrated on or in one wall of the combustion heater in order to supply heat to the air or liquid to be heated. By integrating an electrical heating device into the combustion heater, the combustion heater can be operated much more flexibly and with higher heat output without significantly increasing the installation space required, the installation requirements, and the overall costs.

The invention is detailed below using the attached drawing which schematically shows one embodiment of the invention.

BRIEF DESCRIPTION OF THE DRAWINGS

The sole FIGURE schematically shows a combustion heater which is supplied with fuel from the fuel tank of the motor vehicle to produce combustion heat for heating the coolant from the coolant circuit of the motor vehicle engine.

DETAILED DESCRIPTION OF THE INVENTION

Figure 1:
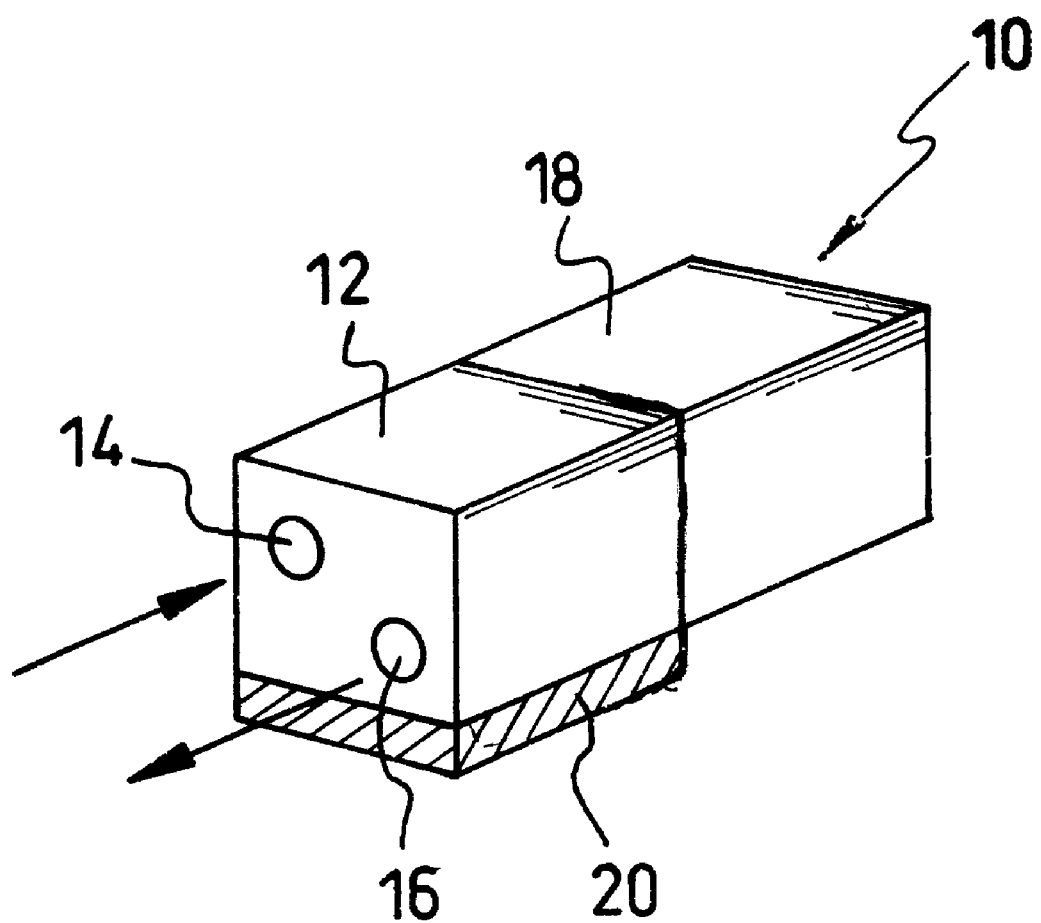

FIG. 1 shows a combustion heater 10 which serves as a heat exchanger and includes a block 12 for feed and discharge of coolant in counterflow by way of a feed channel 14 and a discharge channel 16. The heat exchanger block 12 is preferably composed of a material with good thermal conductivity and is in direct thermal contact with the combustion section 18 of the combustion heater 10. On the bottom surface of the heat exchanger block 12 is at least one PTC (positive temperature coefficient) heating element 20 in direct thermal contact with the heat exchanger block 12 in order to heat the heat exchanger block 12 if necessary, and thus, heat the coolant flowing through the heat exchanger block 12 independently of the combustion section 18. For this purpose, the PTC heating element is supplied with electricity from the vehicle electrical system, the wiring feasibly being chosen such that the PTC element 20 can only consume electricity when the generator is generating enough power to prevent discharge of the vehicle battery.

This integration of the PTC heating element 20 into a combustion heater 10 preferably on or in one wall of the heat exchanger block 12 has the advantage that without significant additional installation cost and installation space requirement, more flexible heating of the engine coolant independently of the engine is possible than is the case in a conventional combustion heater. Thus, on the one hand, heating of the coolant is possible even with the combustion section 18 turned off, by the PTC heating element 20 being supplied with electricity, while on the other hand, when the combustion section 18 is in operation, greater heat output is available, and thus, faster heating of the coolant is possible than would be the case without the additional electrical heating element 20.

With integration in one wall of the combustion heater 10 or of the heat exchanger block 12, the heating element 20 in the form directly during manufacture, for example, when the housing is cast, can be embedded as resistance wires or plates into the corresponding wall. Thus, extremely simple production becomes possible. The electrical heating elements are best protected against damage. Calcification is precluded since there is no contact with the liquid heat exchange medium. Outstanding heat transfer from the heating elements 20 to the respective wall is also ensured.

In an arrangement from outside on one wall of the combustion heater 10 or the heat exchanger block 12, the electrical heating element 20 is advantageously covered, in addition to the outside by a heat insulating layer or foil in order not to have to tolerate major radiation losses to the outside.

What is claimed is:

1. Heating system for heating the interior of a motor vehicle having an engine comprising:

a combustion heater other than said engine for heating at least one of air supplied to the vehicle interior and liquid in a cooling circuit of a motor vehicle engine; and an electrical heating device having at least one heating surface in intimate contact with an outer surface of an outer wall said combustion heater for supplying heat to the at least one air and liquid.

2. Heating system as claimed in claim 1, wherein said combustion heater comprises a heat exchanger block for feeding and discharging a liquid, said heat exchanger block being in direct thermal contact with said heating device to allow heating of said heat exchanger block.

3. Heating system as claimed in claim 2, wherein said heating device comprises at least one PTC heating element.

4. Heating system as claimed in claim 2, wherein said at least one PTC heating element is powered by a motor vehicle electrical system.

5. Heating system as claimed in claim 2, wherein said heating device is located on an outer surface of the heat exchanger block.

6. Heating system as claimed in claim 5, wherein said heating device comprises at least one PTC heating element.

7. Heating system as claimed in claim 5, wherein said at least one PTC heating element is powered by a motor vehicle electrical system.

8. Heating system as claimed in claim 2, wherein said heating device is integrated into a wall of said heat exchanger block.

9. Heating system as claimed in claim 8, wherein said heating device comprises at least one PTC heating element.

10. Heating system as claimed in claim 8, wherein said at least one PTC heating element is powered by a motor vehicle electrical system.

11. Heating system as claimed in claim 1, wherein said heating device comprises at least one PTC heating element.

12. Heating system as claimed in claim 1, wherein said at least one PTC heating element is powered by the motor vehicle electrical system.

* * * * *